United States Patent [19]
Lötter

[11] Patent Number: 5,757,282
[45] Date of Patent: May 26, 1998

[54] LOW RATE TELEMETRY CHANNEL

[75] Inventor: Michiel Petrus Lötter, Boksburg, South Africa

[73] Assignee: Alcatel N.V., Rijswijk, Netherlands

[21] Appl. No.: 727,738

[22] Filed: Oct. 8, 1996

[30] Foreign Application Priority Data

Oct. 12, 1995 [ZA] South Africa .................... 95/8601

[51] Int. Cl.$^6$ .................................................. G08B 5/00
[52] U.S. Cl. .......................... 340/870.05; 371/37.2; 371/57.2; 375/220; 375/240; 340/870.01
[58] Field of Search ............... 340/870.01, 870.05, 340/870.07; 371/37.2, 57.2; 375/240, 220; 358/426

[56] References Cited

U.S. PATENT DOCUMENTS

| | | | |
|---|---|---|---|
| 4,539,691 | 9/1985 | Ogawa | 375/37 |
| 4,779,276 | 10/1988 | Kashida | 371/37.2 |
| 5,136,618 | 8/1992 | Wright | 375/240 |
| 5,258,999 | 11/1993 | Wernimont | 375/7 |
| 5,354,319 | 10/1994 | Wyborny | 607/34 |
| 5,509,031 | 4/1996 | Johnson | 375/262 |
| 5,534,929 | 7/1996 | Tanaka | 348/405 |

*Primary Examiner*—Jeffery Hofsass
*Assistant Examiner*—Albert K. Wong
*Attorney, Agent, or Firm*—Ware, Fressola, Van Der Sluys & Adolphson LLP

[57] ABSTRACT

Low rate telemetry transmission between a transmission side and a receiving side is accomplished at the transmission side on digital information in a channel at a predetermined bit rate by selecting a predetermined frame thereof and outputting a selected one of at least two digital information elements desired for transmission with and in addition to those in the frame by means of a key generator which outputs a known key to the transmission and receiving sides and defined by a sequence of digital information that uniquely identifies the selected digital information elements by first processing the digital information element with the key in a first reversible mathematical manipulation to provide a first output and secondly performing a second reversible mathematical manipulation of the first output and the digital information in the frame to obtain an encoded digital information sequence which is then transmitted from the transmission side and received by the receiving side where it is decoded by reversing the mathematical manipulations for obtaining the frame of digital information in the channel and the key and form identifying the selected element from the key.

19 Claims, 1 Drawing Sheet

LOW RATE TELEMETRY CHANNEL

FIELD OF THE INVENTION

This invention relates to a method of low rate telemetry, and to apparatus therefor.

BACKGROUND TO THE INVENTION

Many digital transmission systems implement some kind of low rate telemetry, using any of a number of methodologies. One approach which is used for such low rate telemetry is to increase the rate of information transmission by inserting telemetry information in the main data stream. This technique requires an increase in the rate of data transmission across the channel, and a corresponding increase in the total transmission bandwidth occupied by the system.

Another approach on systems such as optical fiber transmission systems, is to transmit telemetry information in the main data stream. This technique also requires an increase in the rate of data transmission across the channel, and a consequent increase in the total transmission bandwidth occupied by the system.

A further approach on optical fiber systems such as transmission systems, is to transmit telemetry information by an analog modulation scheme. The bandwidth occupied by this channel, must also be added to the total bandwidth occupied by the transmission system, with a resulting increase in bandwidth.

A third approach relies on some form of pre-coding strategy, in which coding violations can be used to indicate the presence of a binary '1' or binary '0' on the telemetry channel. Although this technique does not require an increase in the transmission rate of the coded data, the bandwidth occupied by the coded data signal will be more than the minimum bandwidth required by the Nyquist criterion.

In this specification a 'field' is a set of numbers, and is denoted by GF(n), where n denotes the number of numbers in the set. Thus GF(2) will imply a set of 2 numbers, i.e. (0,1). Where n is an integer.

Also, a 'closed operation' is said to be closed on some field, GF(n), if the input to the operation, as well as the output of the operation are members of GF(n).

DISCLOSURE OF INVENTION

It is an object of this invention to provide a method of low rate telemetry and apparatus therefor.

In accordance with this invention there is provided low rate telemetry transmission method comprising:

transmitting digital information on a channel at a pre-determined bit rate;

selecting a pre-determined frame of digital information in the channel;

selecting one of at least two digital information elements desired to be transmitted with and in addition to those in the frame;

obtaining a key known at transmission and receiving sides defined by a sequence of digital information which after predetermined processing substantially uniquely identifies the selected digital information element;

performing as part of said predetermined processing a reversible mathematical manipulation of the key and the digital information element to produce a first output; performing a reversible mathematical manipulation of the first output and the digital information in the frame, to obtain an encoded digital information sequence, and transmitting that encoded sequence; and, receiving and decoding the transmitted encoded sequence by reversing the mathematical manipulation to obtain the frame of digital information in the channel and the key, and identifying the selected element from the key.

Preferably the mathematical manipulation is a closed operation, and the digital information in the frame is converted to a form which provides a closed set for further mathematical manipulation.

Further preferably, the conversion is by taking the data as a vector of the length n members each of N elements, and forming a vector therefrom of length N with n-tuple integer elements, and applying offset binary mapping to convert the data to a closed set.

There is provided for the reversible mathematical function to be selected to add redundancy to the said one digital information element.

Where this is done, and offset binary mapping is applied, the mathematical manipulation to obtain the encoded digital information sequence is a closed addition of the first output and the digital information.

There is also provided for the reverse mathematical manipulation for decoding the receive sequence includes the expected value of the periodic crosscorrelation between the received sequence and the key.

Further, the reverse mathematical manipulation to decode the receive sequence includes a threshold determination of the expected value, and the threshold determination of the expected value is the determination of the polarity thereof, and the said one digital information element is one of two polarity alternatives.

Preferably the value of the key is chosen to have an autocorrelation value with peaks at a number of shift values, such that the autocorrelation of the key is much greater than the crosscorrelation of the data in closed set configuration, and the key itself.

The invention also provides apparatus for low rate telemetry transmission between a transmission side and a receiving side, comprising:

means for transmitting digital information on a channel at a pre-determined bit rate and for selecting a pre-determined frame of digital information in the channel;

means for outputting a selected digital information element of at least two digital information elements desired to be transmitted with and in addition to information elements in the frame;

a key generator for outputting a known .key to the transmission and receiving sides, the key being defined by a sequence of digital information which after pre-determined processing substantially uniquely identifies the selected digital information element;

first processing means for performing as part of said predetermined processing a first reversible mathematical manipulation of the key and the digital information element to produce a first output;

second processing means for performing a second reversible mathematical manipulation of the first output and the digital information in the frame, to obtain an encoded digital information sequence, and transmitting that encoded sequence; and, receiving and decoding means for receiving and decoding the transmitted encoded- sequence by reversing the mathematical manipulation to obtain the frame of digital information in the channel and the key, and identifying the selected element from the key.

The second processing means may be arranged to perform a closed mathematical manipulation operation.

The second processing means is arranged to convert the digital information in the frame to a closed set conversion by taking the data as a vector of the length n members each of N elements, and forming a vector therefrom of length N with n-tuple integer elements, and applying offset binary mapping to convert the data to closed set.

Preferably, the first processing means is arranged to provide the reversible mathematical function to add redundancy to the said one digital information element.

In this instance, and where binary offset mapping is applied, the mathematical manipulation to obtain the encoded digital information sequence is a closed addition of the first output and the digital information.

The receiving and decoding means may be arranged to decode the receive sequence to obtain the expected value of the periodic crosscorrelation between the received sequence and the key, and preferably is arranged to obtain a threshold determination of the expected value.

There is provided for the threshold determination of the expected value to be the determination of the polarity thereof, and the said one digital information element to be one of two polarity alternatives.

The key generator can select the key to have an autocorrelation value with peaks at a number of shift values, such that the autocorrelation of the key is much greater than the crosscorrelation of the data in a closed set configuration, and the key itself.

The invention extends to a signal transmitted in accordance with the method and separately, or additionally, the apparatus as set out above.

These and other objects, features and advantages of the present invention will become more apparent in light of the following detailed description of a best mode embodiment thereof, as illustrated in the accompanying drawing.

BRIEF DESCRIPTION OF THE DRAWING

A preferred embodiment of the invention is described below by way of example only, and with reference to the accompanying sole FIGURE, which is a functional block diagram of a telemetry system.

BEST MODE FOR CARRYING OUT THE INVENTION

Figure 1:
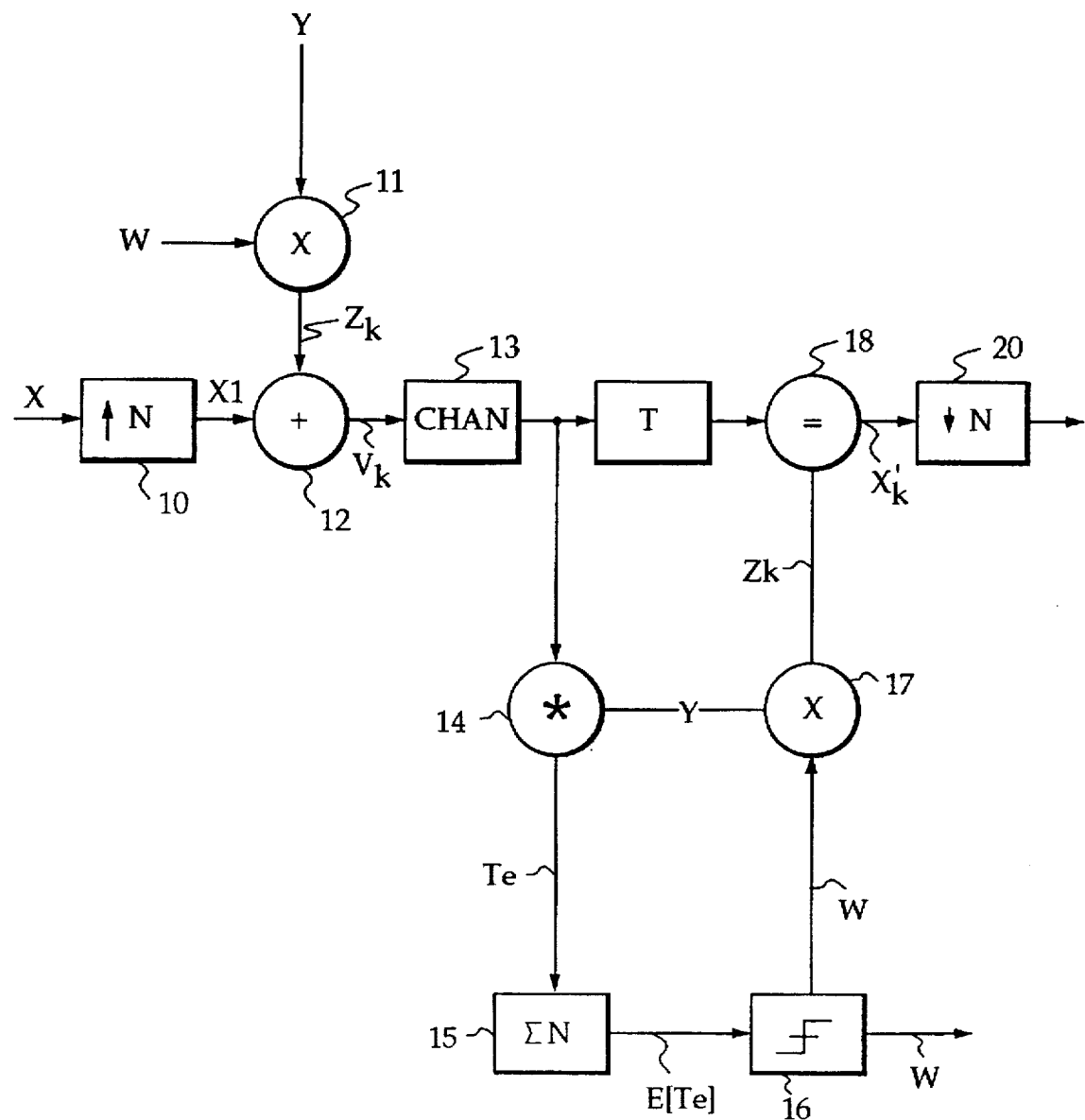

Referring to FIG. 1, a data vector $X_k$ is to be transmitted across a channel, and is input into a processing operation (10) to produce an output of $X_k$. A known code vector Y is input to a multiplication function (11) which has a further input of a low rate telemetry information bit W. The output of the multiplication process (11) is $Z_k$, which is added to $X_k$ in addition means (12), to produce an output $V_k$. $V_k$ is transmitted along channel (13), where it is taken to a correlation function (14). The received signal $V_k$ is correlated with the known vector Y to produce an output $\Sigma_n$ in (15). The $\Sigma_n$ output is tested by a polarity detector (16) for its polarity, and the output therefrom is the low rate telemetry bit W.

The output W as well as the known vector Y are multiplied at multiplication means (17) to produce an output $Z_k$ which is taken to a subtraction means (18). At the subtraction means, the received vector $V_k$ has $Z_k$ subtracted from it, to produce $X_k$. The $X_k$ signal is taken to processing unit (20) which provides the opposite processing to that of unit (10) to have an output of $X_k$.

The operation of this system is further described with reference to FIG. 1. The data that is to be transmitted across the channel at time k is represented by the vector $X_k$ of length nN. Processing operation (10) then treats successive n-tuples of $X_k$ as either offset-binary or two's complement numbers to form a vector $X_k$ of length N with integer elements. For example, let $$X_k=(0,1,1,0,1,1,0,0,0,1,1,0,1,0,0) \quad \text{equation (1)}$$

with n=3 and N=5. The following n-tuples can then be extracted from equation (1) to form $$X_k=(011, 011, 000, 110, 100) \quad \text{equation (2)}$$

and using an offset binary mapping, equation (2) becomes $$X_k=(0,0-3,3,1) \quad \text{equation (3)}$$

In parallel with this operation, the vector $Z_k$ is formed by encoding the low rate telemetry information bit W with a known code vector Y of length N. In general, the elements of Y will be binary, and in this case, the elements of Y will be ±1. In this embodiment the encoding is done by multiplying each element of Y with W in multiplication process (11). This process is exactly the same as the spreading operation in a direct sequence spread spectrum system and adds redundancy to the telemetry bit. The encoding operation used is not limited to such an operation, and any encoding operation that adds redundancy to W can be used. For example, let $$Y_k=(1,-1,1,-1,1) \quad \text{equation (4)}$$

and W be equal to $-1$. Then $Z_k$ will be $$Z_k=W \times Y_k \quad \text{equation (5)}$$

Following this, $X_k$ and $Z_k$ are added in addition means (12). Since an offset-binary representation of the data is used, this closed addition will yield the following $$V_k=X_k+Z_k \quad \text{equation (6)}$$

$$V_k=(-1,1,4,4,0)$$

as a value of $-4$ will map to 4, and a value of 5 to $-3$ respectively. The addition can be regarded as normal linear addition, because the result of the addition will mostly be representable by the n bits used to represent $X_k$. At this state, $V_k$ has N elements, each represented by an n-tuple, yielding a total message length of nN bits, the same number as in the input sequence $X_k$. Therefore the encoding operation has not increased the required bit rate.

At the receiver, the expected value of the periodic crosscorrelation between $V_k$ and Y is calculated and compared to a threshold to determine the value of W. The correlation takes place at correlation function (15). Assuming that the addition of equation 7 is linear, this process can be written as $$\begin{aligned}
E[T_l] &= E[V_k * Y] \quad \text{equation (7)}\\
&E[(X_k+Z_k)*Y]\\
&E[(X_k+WY)*Y]\\
&E[C_{X_kY}+WC_{YY}]\\
&E[C_{X_kY}]+WE[C_{YY}]
\end{aligned}$$

where 1 denotes the shift variable and E[ ] denotes the expected value operation.

$E[C_{X_kY}]$ will approximate zero as N increases as $C_{X_kY}$ is a zero-mean Gaussian random variable. However, the periodic autocorrelation of Y depends only on the choice of Y. Therefore, if Y is chosen to have an autocorrelation with peaks at a number of shift values, E $[C_{YY}]$ will be much greater than E $[C_{X_kY}]$. This means that the sign of E $[T_i]$ will depend solely on W. If E $[T_i]$ is smaller than zero, W will be equal to minus one. This threshold is detected by the polarity detector (16). The telemetry information is thus recovered at this position.

To recover the main data stream, the variable $Z_k$ (see equation 6) is again formed at the decoder by multiplying Y with W in multiplication means. This is possible because W is now known. Subtracting $Z_k$ from $V_k$ in subtraction will then yield $$V_k - Z_k = X_k + Z_k - Z_k \quad\quad \text{equation (8)}$$
$$= X_k$$

After processing at operation (20) $X_k$ is reversed back to $X_k$ and the original data stream is recovered.

Simulations of the above embodiment were performed for code lengths of N=64 and N=128 to prove the feasibility of the system. The performance of the system was also tested when used in conjunction with short repetition codes for error correction. In each case, a majority logic decision was made as to the value of W. Table 1 shows the simulation results for different code lengths (N) and different repetition code lengths. The bit error rate (BER) values given, are the BER of the telemetry channel. No errors were introduced into the received signal. The BER of the data stream will be slightly better than that of the telemetry channel, and therefore the BER of the telemetry channel can be seen as an upper bound for the BER of the data channel. Clearly the BER is a function of N, and in fact, by increasing N the BER can be made as low as required.

TABLE 1

BER performance of telemetry system.

| N | Repetition Code Length | BER |
|---|---|---|
| 64 | 1 | $5.3 \times 10^{-2}$ |
|  | 3 | $8.9 \times 10^{-3}$ |
|  | 5 | $1.4 \times 10^{-3}$ |
| 128 | 1 | $1.2 \times 10^{-2}$ |
| 128 | 3 | $3.9 \times 10^{-4}$ |
| 128 | 5 | $1.3 \times 10^{-5}$ |

The system exhibits no increase in the transmission bandwidth above the minimum Nyquist bandwidth. Information is added to the data stream using operations closed in GF ($2^n$), and thus, although the actual values of the data stream are changed, the nature of the data stream remains unchanged since the data remains binary and the data rate has not been altered. The encoded telemetry information is added element by element to the data stress without increasing the transmission rate of the data, and is included in every element of the data signal. This data is recovered by examining every bit using a periodic correlation function.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A low rate telemetry transmission method for transmission of digital information between a transmission side and a receiving side, comprising:

transmitting digital information on a channel at a predetermined bit rate;

selecting a pre-determined frame of digital information in the channel;

selecting one of at least two digital information elements desired to be transmitted with and in addition to those in the frame;

obtaining a key, known at transmission and receiving sides defined by a sequence of digital information which after predetermined processing substantially uniquely identifies the selected digital information element;

performing as part of said predetermined processing a first reversible mathematical manipulation of the key and the digital information element to produce a first output;

performing a second reversible mathematical manipulation of the first output and the digital information in the frame, to obtain an encoded digital information sequence, and transmitting that encoded sequence; and, receiving and decoding the transmitted encoded sequence by reversing the first and second mathematical manipulations for obtaining the frame of digital information in the channel and the key, and for identifying the selected element from the key.

2. A method as claimed in claim 1 in which the mathematical manipulation is a closed operation.

3. A method as claimed in claim 2 in which the digital information in the frame is converted to a form which provides a closed set for further mathematical manipulation.

4. A method as claimed in claim 3 in which the conversion is by taking the digital information as a vector of a length having n members each of N elements, and forming a vector therefrom of length N with n-tuple integer elements, and applying offset binary mapping to convert the digital information to a closed set.

5. A method as claimed in claim 4 in which the first reversible mathematical manipulation is selected to add redundancy to the said one digital information element.

6. A method as claimed in claim 5 in which the second reversible mathematical manipulation to obtain the encoded digital information sequence is a closed addition of the first output and the digital information.

7. A method as claimed in claim 6 in which the reversing of the mathematical manipulation for receiving and decoding the transmitted encoded sequence includes an expected value of a periodic crosscorrelation between the received sequence and the key.

8. A method as claimed in claim 7 in which the reversing of the mathematical manipulation for receiving and decoding the transmitted encoded sequence includes a threshold determination of the expected value.

9. A method as claimed in claim 8 in which the threshold determination of the expected value is a determination of a polarity thereof, and the said selected one of at least two digital information elements is one of two polarity alternatives.

10. A method as claimed in claim 9 in which a value of the key is chosen to have an autocorrelation value with peaks at a number of shift values, such that an expected value of an autocorrelation of the key is much greater than the crosscorrelation of the digital information in a closed set configuration, and the key itself.

11. Apparatus for low rate telemetry transmission between a transmission side and a receiving side, comprising:

means for transmitting digital information on a channel at a pre-determined bit rate and for selecting a pre-determined frame of digital information in the channel;

means for outputting a selected digital information element of at least two digital information elements desired to be transmitted with and in addition to information elements in the frame;

a key generator for outputting a known key to the transmission and receiving sides, the key being defined by a sequence of digital information which after predetermined processing substantially uniquely identifies the selected digital information element;

first processing means for performing as part of said predetermined processing a first reversible mathematical manipulation of the key and the digital information element to produce a first output;

second processing means for performing a second reversible mathematical manipulation of the first output and the digital information in the frame, to obtain an encoded digital information sequence, and transmitting that encoded sequence; and, receiving and decoding means for receiving and decoding the transmitted encoded sequence by reversing the first and second mathematical manipulation for obtaining the frame of digital information in the channel and the key, and for identifying the selected element from the key.

12. Apparatus as claimed in claim 11 in which the second processing means is arranged to perform a closed mathematical manipulation operation.

13. Apparatus as claimed in claim 12 in which the second processing means is arranged to convert the digital information in the frame to a closed set conversion by taking the data as a vector of a length having n members each of N elements, and forming a vector therefrom of length N with n-tuple integer elements, and applying offset binary mapping to convert the digital information to a closed set.

14. Apparatus as claimed in claim 13 in which the first processing means is arranged to provide the reversible mathematical function to add redundancy to the said one digital information element.

15. Apparatus as claimed in claim 14 in which the second mathematical manipulation to obtain the encoded digital information sequence is a closed addition of the first output and the digital information.

16. Apparatus as claimed in claim 15 in which the receiving and decoding means is arranged to decode the transmitted encoded sequence to obtain an expected value of a periodic crosscorrelation between the received sequence and the key.

17. Apparatus as claimed in claim 16 in which the receiving and decoding means is arranged to obtain a threshold determination of the expected value.

18. Apparatus as claimed in claim 17 in which the threshold determination of the expected value is a determination of a polarity thereof, and the said determination of said polarity of said selected digital information element is one of two polarity alternatives.

19. Apparatus as claimed in claim 18 in which the key generator can select the key to have an autocorrelation value with peaks at a number of shift values, such that an expected value of an autocorrelation of the key is much greater than the crosscorrelation of the digital information in a closed set configuration, and the key itself.

* * * * *